(12) United States Patent  (10) Patent No.: US 9,414,392 B2
Sirotkin  (45) Date of Patent: Aug. 9, 2016

(54) APPARATUS, SYSTEM AND METHOD OF USER-EQUIPMENT (UE) CENTRIC ACCESS NETWORK SELECTION

(71) Applicant: Intel Corporation, Santa Clara, CA (US)

(72) Inventor: Alexander Sirotkin, Giv'on Hachadasha (IL)

(73) Assignee: INTEL CORPORATION, Santa Clara, CA (US)

( * ) Notice: Subject to any disclaimer, the term of this patent is extended or adjusted under 35 U.S.C. 154(b) by 16 days.

(21) Appl. No.: 14/093,476

(22) Filed: Dec. 1, 2013

(65) Prior Publication Data

US 2014/0153511 A1  Jun. 5, 2014

Related U.S. Application Data

(60) Provisional application No. 61/732,851, filed on Dec. 3, 2012, provisional application No. 61/808,597, filed on Apr. 4, 2013.

(51) Int. Cl.
*H04W 72/04* (2009.01)
*H04W 48/06* (2009.01)
(52) U.S. Cl.
CPC .......... *H04W 72/0486* (2013.01); *H04W 48/06* (2013.01)
(58) Field of Classification Search
None
See application file for complete search history.

(56) References Cited

U.S. PATENT DOCUMENTS

| 7,212,837 | B1 | 5/2007 | Calhoun et al. |
|---|---|---|---|
| 7,965,693 | B2 | 6/2011 | Jiang et al. |
| 8,112,087 | B2 | 2/2012 | Jeong et al. |
| 8,467,351 | B2 | 6/2013 | Liu et al. |
| 8,774,039 | B2 | 7/2014 | Hirano et al. |
| 8,842,633 | B2 | 9/2014 | Dwyer et al. |
| 8,918,096 | B2 | 12/2014 | Drazynski et al. |
| 2004/0082327 | A1 | 4/2004 | Kim et al. |
| 2004/0165563 | A1 | 8/2004 | Hsu et al. |
| 2005/0153692 | A1 | 7/2005 | Hwang et al. |
| 2005/0210154 | A1 | 9/2005 | Verma et al. |
| 2005/0254469 | A1 | 11/2005 | Verma et al. |
| 2005/0255851 | A1 | 11/2005 | Schreiber |
| 2006/0018284 | A1 | 1/2006 | Rudolf et al. |

(Continued)

FOREIGN PATENT DOCUMENTS

CN  101167392 B  6/2012
EP  2389030  11/2011

(Continued)

OTHER PUBLICATIONS

International Search Report and Written Opinion for PCT Patent Application No. PCT/US2013/064761, mailed on Jan. 20, 2014, 11 pages.

(Continued)

*Primary Examiner* — Benjamin H Elliott, IV
(74) *Attorney, Agent, or Firm* — Shichrur & Co.

(57) ABSTRACT

Some demonstrative embodiments include devices, systems of User Equipment (UE) centric access network selection. For example, a cellular node may include a transmitter to transmit to a User Equipment (UE) a cellular communication message over a cellular communication medium, the message including a value of a predefined parameter, which is based on a cellular network load of a cellular network controlled by the cellular node.

22 Claims, 2 Drawing Sheets

(56) References Cited

U.S. PATENT DOCUMENTS

| | | | |
|---|---|---|---|
| 2006/0189331 A1 | 8/2006 | Lundsjo et al. | |
| 2006/0223567 A1 | 10/2006 | Kwak et al. | |
| 2007/0097918 A1 | 5/2007 | Cai et al. | |
| 2008/0207195 A1 | 8/2008 | Ranta et al. | |
| 2010/0317315 A1 | 12/2010 | Burbidge et al. | |
| 2010/0323698 A1* | 12/2010 | Rune et al. | 455/436 |
| 2011/0058531 A1 | 3/2011 | Jain et al. | |
| 2011/0188472 A1* | 8/2011 | Jeon et al. | 370/331 |
| 2011/0306386 A1 | 12/2011 | Centoza et al. | |
| 2012/0100853 A1 | 4/2012 | Xiong et al. | |
| 2012/0113843 A1 | 5/2012 | Watfa et al. | |
| 2012/0294215 A1* | 11/2012 | Ekici et al. | 370/311 |
| 2013/0083661 A1 | 4/2013 | Gupta et al. | |
| 2013/0083722 A1* | 4/2013 | Bhargava et al. | 370/315 |
| 2013/0083783 A1* | 4/2013 | Gupta et al. | 370/338 |
| 2013/0163424 A1* | 6/2013 | Goerke | H04W 24/02 370/235 |
| 2013/0163463 A1* | 6/2013 | Grayson et al. | 370/253 |
| 2013/0242965 A1* | 9/2013 | Horn et al. | 370/338 |
| 2013/0250834 A1 | 9/2013 | Seok et al. | |
| 2013/0308445 A1* | 11/2013 | Xiang et al. | 370/230 |
| 2013/0322238 A1* | 12/2013 | Sirotkin | 370/230 |
| 2014/0050086 A1* | 2/2014 | Himayat | H04N 21/2365 370/230 |
| 2014/0112170 A1* | 4/2014 | Zhou et al. | 370/252 |
| 2014/0133294 A1* | 5/2014 | Horn | H04W 28/0247 370/230 |
| 2014/0133304 A1* | 5/2014 | Pica et al. | 370/232 |
| 2014/0153511 A1* | 6/2014 | Sirotkin | 370/329 |
| 2014/0161103 A1 | 6/2014 | Sirotkin et al. | |
| 2015/0382281 A1 | 12/2015 | Sirotkin | |
| 2016/0014667 A1 | 1/2016 | Sirotkin et al. | |
| 2016/0020890 A1 | 1/2016 | Sirotkin et al. | |
| 2016/0142163 A1 | 5/2016 | Sirotkin | |

FOREIGN PATENT DOCUMENTS

| | | |
|---|---|---|
| KR | 20060084002 | 7/2006 |
| KR | 20110126913 | 11/2011 |
| KR | 20120005508 | 1/2012 |
| TW | 200723922 A | 6/2007 |
| TW | 201146046 A | 12/2011 |
| WO | 2012121757 | 9/2012 |

OTHER PUBLICATIONS

ETSI TS 136 300 V11.3.0 (Nov. 2012), LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11), 217 pages.
ETSI TS 136 331 V10.7.0 (Nov. 2012), LTE; Evolved Universal Terrestrial Radio Access (E-UTRA); Radio Resource Control (RRC); Protocol specification (3GPP TS 36.331 version 10.7.0 Release 10), 307 pages.
3GPP TSG-RAN Meeting #57, RP-1201455, "WLAN/3GPP Radio Interworking", Sep. 13-15, 2012, 5 pages.
3GPP TS 23.401 V10.7.0 (Mar. 2012), 3rd Generation Partnership Project; Technical Specification Group Services and System Aspects; General Packet Radio Service (GPRS) enhancements for Evolved Universal Terrestrial Radio Access Network (E-UTRAN) access (Release 10), 278 pages.
ETSI TS 136 413 V11.1.0 (Oct. 2012), LTE; Evolved Universal Terrestrial Radio Access Network (E-UTRAN); S1 Application Protocol (S1AP) (3GPP TS 36.413 version 11.1.0 Release 11), 270 pages.
3GPP TS 36.423 V11.0.0 (Mar. 2012), 3rd Generation Partnership Project; Technical Specification Group Radio Access Network; Evolved Universal Terrestrial Radio Access Network (E-UTRAN); X2 application protocol (X2AP) (Release 11), 134 pages.
IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.
Wi-Fi Alliance Technical Committee P2P Task Group; Wi-Fi Peer-to-Peer (P2P) Technical Specification; Version 1.2; Dec. 14, 2011; 160 pages.
3GPP RWS-120010, "Requirements, Candidate Solutions & Technology Roadmap for LTE Rel-12 Onward," NTT DOCOMO, Inc, Jun. 2012, 27 pages.
3GPP TSG RAN2 Meeting #81, R2-130887, "TR 37.8xx v0.1.0 on Study on WLAN/3GPP Radio Interworking", Feb. 2013, 9 pages.
3GPP TS 25.433 V11.1.0 (Jun. 2012), 3rd Generation Partnership Project; Technical Specification Group Radio Access Network; UTRAN Iub interface Node B Application Part (NBAP) signalling (Release 11), Jun. 2012, 1336 pages.
3GPP TS 25.331 V10.9.0 (Sep. 2012), 3rd Generation Partnership Project; Technical Specification Group Radio Access Network; Radio Resource Control (RRC); Protocol specification (Release 10), Sep. 2012, 1984 pages.
International Search Report and Written Opinion for PCT Patent Application No. PCT/US2013/077905, mailed on Feb. 28, 2014, 10 pages.
Office Action for Taiwanese Patent Application No. 103112548, mailed on May 25, 2015, 12 pages, including 1 page of English translation.
Office Action for U.S. Appl. No. 14/068,221, mailed on Jun. 2, 2015, 29 pages.
International Preliminary Report on Patentability and Written Opinion for International Application No. PCT/US2013/064761, mailed on Jul. 30, 2015, 8 pages.
International Preliminary Report on Patentability for PCT/US2013/077905, mailed on Oct. 15, 2015, 7 pages.
Office Action for U.S. Appl. No. 14/129,295, mailed on Oct. 28, 2015, 18 pages.
3GPP TS 25.433, Universal Mobile Telecommunications System (UMTS); UTRAN Iub interface Node B Application Part (NBAP) Signaling, version 113.0 Release 11, Feb. 2013, 1328 pages.
3GPP TS 25.331: 3rd Generation Partnership Project; Technical Specification Group Radio Access Network; Radio Resource Control (RRC); Protocol specification (Release 10), V10.11.0, Mar. 2013, 1897 pages.
Office Action for Taiwanese Patent Application No. 103112288, mailed on Nov. 20, 2015, 19 pages, including 9 page of English translation.
International Search Report and Written Opinion for PCT Patent Application No. PCT/US2013/077906, mailed on Feb. 28, 2014, 10 pages.
International Preliminary Report on Patentability for International Application No. PCT/US2013/077906, mailed on Oct. 15, 2015, 7 pages.
Office Action for U.S. Appl. No. 14/068,221, mailed on Dec. 22, 2015, 37 pages.
Office Action for Korean Patent Application Serial No. 2015-7015916, mailed on Mar. 24, 2016, 12 pages.(Including 6 pages of English translation.).
Office Action for U.S. Appl. No. 14/129,295, mailed on Apr. 7, 2016, 14 pages.

* cited by examiner

APPARATUS, SYSTEM AND METHOD OF USER-EQUIPMENT (UE) CENTRIC ACCESS NETWORK SELECTION

CROSS REFERENCE

This application claims the benefit of and priority from U.S. Provisional Patent Application No. 61/732,851 entitled "Advanced Wireless Communication Systems and Techniques", filed Dec. 3, 2012, and U.S. Provisional Patent Application No. 61/808,597 entitled "Advanced Wireless Communication Systems and Techniques", filed Apr. 4, 2013, the entire disclosures of both of which are incorporated herein by reference.

TECHNICAL FIELD

Some embodiments described herein generally relate to User Equipment (UE) centric access network selection.

BACKGROUND

A wireless communication device, e.g., a mobile device, may be configured to utilize multiple wireless communication technologies.

For example, a User Equipment (UE) device may be configured to utilize a cellular connection, e.g., a Long Term Evolution (LTE) cellular connection, as well as a wireless-local-area-network (WLAN) connection, e.g., a Wireless-Fidelity (WiFi) connection.

The UE may be configured to automatically utilize a WiFi connection, for example, as long as a Wi-Fi signal received by the UE is strong enough.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
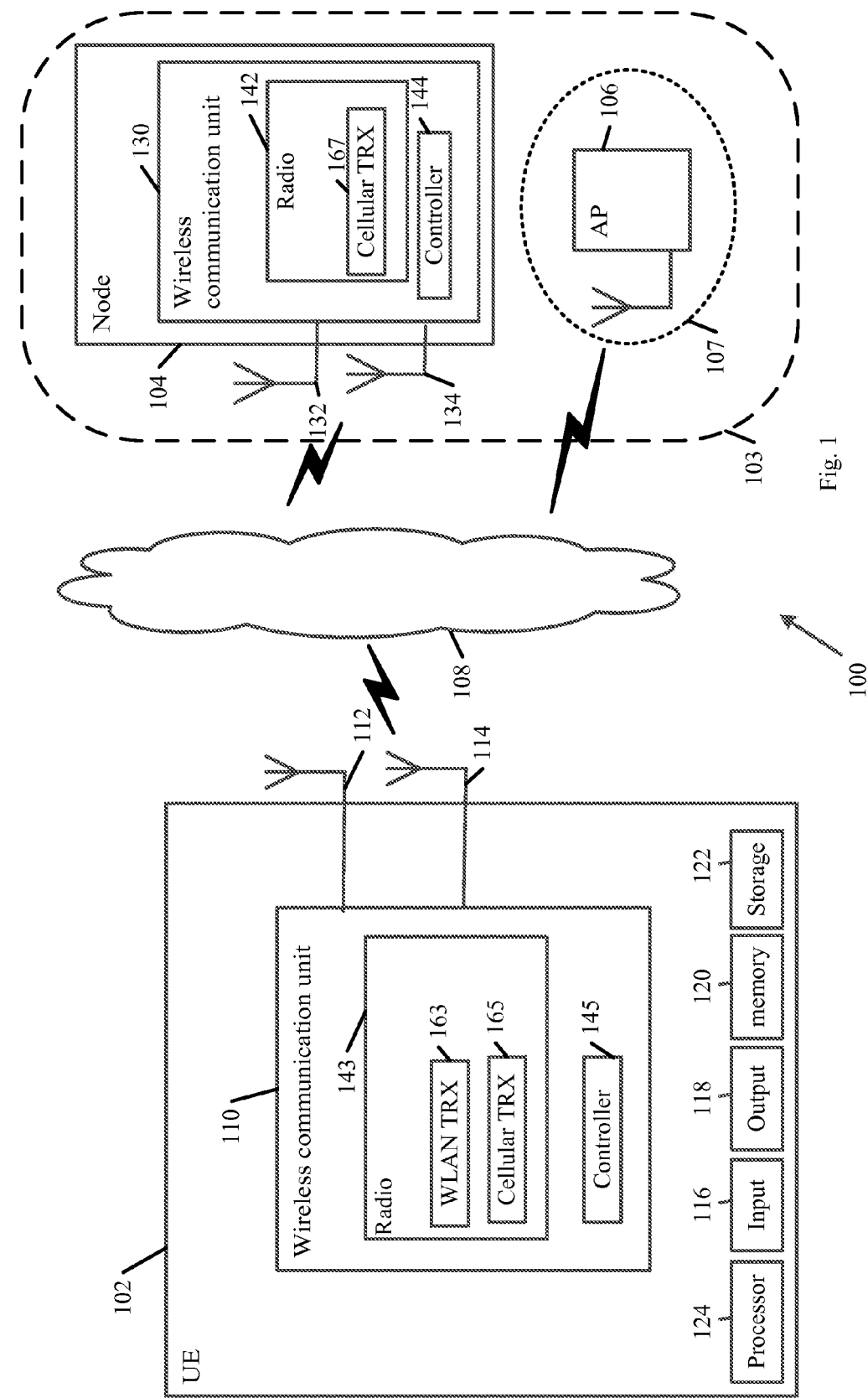
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a cellular network, a cellular node, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including "*3GPP TS 36.300—Evolved Universal Terrestrial Radio Access (E-UTRA) and Evolved Universal Terrestrial Radio Access Network (E-UTRAN); Overall description; Stage 2*"; "*RAN2 RRC—3GPP TS 36.331: Evolved Universal Terrestrial Radio Access (E-UTRA); Radio Resource Control (RRC); Protocol specification*"; "RAN3 X2—3GPP TS 36.423: Evolved Universal Terrestrial Radio Access Network (E-UTRAN); X2 Application Protocol (X2AP)"; 3GPP TS 23.401 General Packet Radio Service (GPRS) enhancements for Evolved Universal Terrestrial Radio Access Network (E-UTRAN) access"; and "3GPP TS 36.413 Evolved Universal Terrestrial Radio Access Network (E-UTRAN); S1 Application Protocol (S1AP)") and/or future versions and/or derivatives thereof, devices and/or networks operating in accordance with existing Wireless-Gigabit-Alliance (WGA) specifications (*Wireless Gigabit Alliance, Inc WiGig MAC* and *PHY Specification Version* 1.1, *April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a LTE cellular system. However, other embodiments may be implemented in any other suitable cellular network, e.g., a 3G cellular network, a 4G cellular network, a 5G cellular network, a WiMax cellular network, and the like.

Some demonstrative embodiments are described herein with respect to a WLAN system. However, other embodiments may be implemented in any other suitable non-cellular network.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells.

Other embodiments may be used in conjunction with any other wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

The phrase "access point" (AP), as used herein, may include an entity that includes a station (STA) and provides access to distribution services, via the Wireless Medium (WM) for associated STAs.

The term "station" (STA), as used herein, may include any logical entity that is a singly addressable instance of a medium access control (MAC) and a physical layer (PHY) interface to the WM.

The phrases "directional multi-gigabit (DMG)" and "directional band" (DBand), as used herein, may relate to a frequency band wherein the Channel starting frequency is above 56 GHz.

The phrases "DMG STA" and "mmWave STA (mSTA)" may relate to a STA having a radio transmitter, which is operating on a channel that is within the DMG band.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums 108. For example, system 100 may include at least one User Equipment (UE) 102 capable of communicating with one or more wireless communication networks, e.g., as described below.

Wireless mediums 108 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, system 100 may include at least one cellular network 103, e.g., a cell controlled by a cellular node ("node") 104.

In some demonstrative embodiments, system 100 may include a non-cellular network 107, for example, a WLAN, e.g., a Basic Service Set (BSS), managed by an Access Point (AP) 106.

In some demonstrative embodiments, non-cellular network 107 may at least partially be within a coverage area of node 104. For example, AP 106 may be within a coverage area of node 104.

In some demonstrative embodiments, node 104 may include an Evolved Node B (eNB). For example, node 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In other embodiments, node 104 may include any other functionality and/or may perform the functionality of any other cellular node, e.g., a Node B (NB), a base station or any other node or device.

In some demonstrative embodiments, UE 102 may include, for example, a mobile computer, a laptop computer, a notebook computer, a tablet computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, UE 102, node 104 and/or AP 106 may include one or more wireless communication units to perform wireless communication between UE 102, node 104, AP 106 and/or with one or more other wireless communication devices, e.g., as described below. For example, UE 102 may include a wireless communication unit 110 and/or node 104 may include a wireless communication unit 130.

In some demonstrative embodiments, wireless communication units 110 and 130 may include, or may be associated with, one or more antennas. In one example, wireless communication unit 110 may be associated with at least two antennas, e.g., antennas 112 and 114, or any other number of antennas, e.g., one antenna or more than two antennas; and/or wireless communication unit 130 may be associated with at least two antennas, e.g., antennas 132 and 134, or any other number of antennas, e.g., one antenna or more than two antennas.

In some demonstrative embodiments, antennas 112, 114, 132 and/or 134 may include any type of antennas suitable for transmitting and/or receiving wireless communication signals, blocks, frames, transmission streams, packets, messages and/or data. For example, antennas 112, 114, 132 and/or 134 may include any suitable configuration, structure and/or arrangement of one or more antenna elements, components, units, assemblies and/or arrays. For example, antennas 112, 114, 132 and/or 134 may include a phased array antenna, a dipole antenna, a single element antenna, a set of switched beam antennas, and/or the like.

In some embodiments, antennas 112, 114, 132 and/or 134 may implement transmit and receive functionalities using separate transmit and receive antenna elements. In some embodiments, antennas 112, 114, 132 and/or 134 may implement transmit and receive functionalities using common and/or integrated transmit/receive elements.

In some demonstrative embodiments, wireless communication unit 130 may include at least one radio 142 and at least one controller 144 to control communications performed by radio 142, and/or wireless communication unit 110 may include at least one radio 143 and at least one controller 145 to control communications performed by radio 143. For example, radios 142 and/or 143 may include one or more wireless transmitters, receivers and/or transceivers able to send and/or receive wireless communication signals, RF signals, frames, blocks, transmission streams, packets, messages, data items, and/or data.

In some demonstrative embodiments, at least one radio 143 may include a WLAN transceiver (TRX) 163 to communicate with AP 106 over a WLAN link, and a cellular transceiver 165 to communicate with node 104 over a cellular link.

In some demonstrative embodiments, radio 142 may include a cellular transceiver 167 to communicate with node 104 over the cellular link.

In some demonstrative embodiments, the WLAN link may include, for example, a Wireless Fidelity (WiFi) link, a Wireless Gigabit (WiGig) link, or any other link.

In some demonstrative embodiments, the WLAN link may include, for example, a link over the 2.4 Gigahertz (GHz) or 5 GHz frequency band, the 60 GHz frequency band, or any other frequency band.

In some demonstrative embodiments, radios 142 and/or 143 may include a multiple input multiple output (MIMO) transmitters receivers system (not shown), which may be capable of performing antenna beamforming methods, if desired. In other embodiments, radios 142 and/or 143 may include any other transmitters and/or receivers.

In some demonstrative embodiments, radios 142 and/or 143 may include a turbo decoder and/or a turbo encoder (not shown) for encoding and/or decoding data bits into data symbols, if desired. In other embodiments, radios 142 and/or 143 may include any other encoder and/or decode.

In some demonstrative embodiments, radios 142 and/or 143 may include OFDM and/or SC-FDMA modulators and/or demodulators (not shown) configured to communicate OFDM signals over downlink channels, e.g., between node 104 and UE 102, and SC-FDMA signals over uplink channels, e.g., between UE 102 and node 104. In other embodiments, radios 142 and/or 143 may include any other modulators and/or demodulators.

In some demonstrative embodiments, wireless communication unit 110 may establish a WLAN link with AP 106. For example, wireless communication unit 110 may perform the functionality of one or more STAs, e.g., one or more WiFi STAs, WLAN STAs, and/or DMG STAs. The WLAN link may include an uplink and/or a downlink. The WLAN downlink may include, for example, a unidirectional link from AP 106 to the one or more STAs or a unidirectional link from a Destination STA to a Source STA. The uplink may include, for example, a unidirectional link from a STA to AP 106 or a unidirectional link from the Source STA to the Destination STA.

In some demonstrative embodiments, UE 102, node 104 and/or AP 106 may also include, for example, one or more of a processor 124, an input unit 116, an output unit 118, a memory unit 120, and a storage unit 122. UE 102, node 104 and/or AP 106 may optionally include other suitable hardware components and/or software components. In some demonstrative embodiments, some or all of the components of one or more of UE 102, node 104 and/or AP 106 may be enclosed in a common housing or packaging, and may be interconnected or operably associated using one or more wired or wireless links. In other embodiments, components of one or more of UE 102, node 104 and/or AP 106 may be distributed among multiple or separate devices.

Processor 124 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of UE 102, node 104 and/or AP 106 and/or of one or more suitable applications.

Input unit 116 includes, for example, a keyboard, a keypad, a mouse, a touch-screen, a touch-pad, a track-ball, a stylus, a microphone, or other suitable pointing device or input device. Output unit 118 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by UE 102, node 104 and/or AP 106.

In some demonstrative embodiments, UE 102 may be configured utilize a cellular connection, e.g., a Long Term Evolution (LTE) cellular connection, a Universal Mobile Telecommunications System (UMTS) connection or any other cellular connection, to communicate with node 104, and a WLAN connection, e.g., a Wireless-Fidelity (WiFi) connection or any other WLAN connection, to communicate with AP 106.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi-Radio Access Technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In other embodiments, system 100 may implement any other architecture and/or deployment.

In some demonstrative embodiments, utilizing the WLAN connection as a default connection, e.g., as long as UE 102 receives from AP 106 a strong enough signal, may result in an increase in the congestion of the WLAN, e.g., if a large number of UEs simultaneously connect to the same AP, which in turn may result in a decrease of throughput over the WLAN connection between UE 102 and AP 106.

In some demonstrative embodiments, UE 102, node 104 and/or AP 106 may be configured to enable selective connection of UE 102 to the WLAN or the cellular network, for example, based on one or more criteria and/or parameters, e.g., as described in detail below.

In some demonstrative embodiments, the selective connection between UE 102 and node 104 or AP 106 may enable, for example, load balancing between the WLAN and the cellular network.

In some demonstrative embodiments, UE 102, node 104 and/or AP 106 may be configured to facilitate a UE-centric (also referred to as "UE controlled") access network selection scheme, in which UE 102 may select an access network to be utilized by UE 102.

Some demonstrative embodiments may be implemented, for example, without requiring any changes for WLAN interfaces, e.g., by utilizing existing WLAN functionality.

In some demonstrative embodiments, node 104 may provide to UE 102 a value of a predefined parameter, which may be used by the UE 102 as part of access network selection and/or a traffic steering decision ("UE assistance parameter", also referred to as the "access network selection and traffic steering parameter"), e.g., as described in detail below.

In some demonstrative embodiments, UE 102 may control access network selection based on the value of the UE assistance parameter received from node 104, e.g., as described below.

In some demonstrative embodiments, the UE-assistance parameter may include a parameter related to cellular network load ("the cellular load-related parameter"), e.g., as described below. In other embodiments, the UE assistance parameter may include any other parameter, which may be explicitly or implicitly related to the cellular network load and/or to any other attribute of the cellular network.

In some demonstrative embodiments, controller 145 may control access network selection of UE 102 with respect to a WLAN, e.g., WLAN 107, for example, based on the cellular load-related parameter and a value of a predefined parameter, which may be based on a WLAN network load of the WLAN ("the WLAN load-related parameter"), e.g., as described in detail below.

In some demonstrative embodiments, UE 102 may determine the WLAN load-related parameter of WLAN 107, for example, based on WLAN information received from AP 104 and/or via one or more intermediate devices, for example, in the form of BSS Load and/or BSS available admission capacity information, e.g., accordance with the IEEE 802.11 specifications.

In some demonstrative embodiments, controller 145 may control access network selection of UE 102 with respect to WLAN 107, for example, based on a predefined selection criterion applied to the value of the parameter received from node 104 and a WLAN load of WLAN 107, e.g., as described below. In one example, UE 102 may determine the WLAN load of WLAN 107, e.g., based on load information received from AP 106.

The phrase "network load" as used herein with respect to a communication network may relate to a load, an access network load, a backhaul load, a level of congestion, a capacity level, an available capacity, a free capacity, a usage level, a ratio between used capacity and available capacity, and/or an available bandwidth of the communication network.

For example, the phrase "WLAN network load" as used herein with respect to a WLAN may relate to a load, an access network load, a backhaul load, a level of congestion, a capacity level, an available capacity, a free capacity, a usage level, a ratio between used capacity and available capacity, and/or an available bandwidth of the WLAN.

For example, the phrase "cellular network load" as used herein with respect to a cell may relate to a load, an access network load, a backhaul load, a level of congestion, a capacity level, an available capacity, a free capacity, a usage level, a ratio between used capacity and available capacity, and/or an available bandwidth of the cell.

In some demonstrative embodiments, node 104 may provide UE 102 with an indication of the cellular network load of cellular network 103, e.g., to enable UE 102 to select from WLAN 107 and cellular network 103 a network having the lowest load. The selection of the network having the lowest load may, for example, enable load balancing between cellular network 103 and WLAN 107.

In some demonstrative embodiments, node 104 may provide to UE 102 a value a cellular load-related parameter, which may be based on the load of cellular network 103, and may be configured to enable UE 102 to select between cellular network 103 and WLAN 107, e.g., as described in detail below.

In some demonstrative embodiments, the UE assistance parameter may be configured to enable UE 102 to select between cellular network 103 and WLAN 107, for example, based on an amount of resources to be allocated to UE 102 by cellular node 103.

In some demonstrative embodiments, the cellular load-related parameter may include a resource allocation parameter representing an amount of resource for allocation by node 104 to UE 102.

In some demonstrative embodiments, node 104 may provide to UE 102 the cellular load-related parameter configured to indicate a maximal resource block parameter representing a maximal number of resource blocks for allocation by node 104 to the UE 102.

In some demonstrative embodiments, the UE assistance parameter may explicitly include the maximum resource allocation that UE 102 may receive when connected to cell 103. In other embodiments, the access network selection and traffic steering parameter may include a parameter, which may implicitly indicate the maximum resource allocation that UE 102 may receive when connected to cell 103.

In some demonstrative embodiments, node 104 may provide the UE parameter to UE 102, for example, when UE is at an Idle mode with respect to cellular network 103, e.g., as described below.

In some demonstrative embodiments, node 104 may provide the cellular load-related UE assistance parameter to UE 102, for example, when UE is at a connected mode with respect to cellular network 103, e.g., as described below.

In some demonstrative embodiments, UE 102 may receive from node 104 the UE assistance parameter corresponding to cellular network 103, and UE 102 may determine a maximal achievable rate of a cellular connection to cellular network 103. For example, controller 145 may determine a maximal achievable rate of a connection between UE 102 and cellular network 103 based on the cellular load-related parameter and one or more additional parameters, e.g., bandwidth measurements, channel measurement, MIMO capabilities, and the like, e.g., as described below.

In some demonstrative embodiments, UE 102 may determine a maximal achievable rate of a WLAN connection between UE 102 and WLAN 107, for example, based on WLAN load information received from AP 106 and/or one or more additional parameters, e.g., bandwidth measurements, channel measurement, MIMO capabilities, and the like.

In some demonstrative embodiments, controller 145 may control access network selection of UE 102 based on a predefined selection criterion applied to the access network selection and traffic steering parameter, e.g., as described below.

In some demonstrative embodiments, controller 145 may select between cellular network 103 and WLAN 107, for example, based on a comparison between the maximal achievable rate of the WLAN connection between UE 102 and WLAN 107 and the maximal achievable rate of the cellular connection between UE 102 and cellular network 103. For example, controller 145 may select from networks 103 and 107 the network providing the greater maximal achievable rate.

In some demonstrative embodiments, controller 145 may apply a hysteresis mechanism to the selection between networks 103 and 107, e.g., to prevent a "ping-pong" effect, for example, when UE 102 is located near a cell edge of cellular network 103.

In some demonstrative embodiments, the selection between cellular network 103 and WLAN 107 may take into consideration one or more additional parameters, e.g., according to a more complex access network selection mechanism.

In one example, an access network selection decision, e.g., to select between cellular network 103 and WLAN 107, may be based on user preferences, operator policies, e.g., provided via an Access Network Discovery and Selection Function (ANDSF) mechanism, and the like.

In some demonstrative embodiments, utilizing the maximal achievable rate of the WLAN connection between UE 102 and WLAN 107 and the maximal achievable rate of the cellular connection between UE 102 and cellular network 103 may enable UE 102, for example, to make an optimal access network selection decision, e.g., to connect to the network providing best performance in terms of maximal achievable rate.

In some demonstrative embodiments, UE 102 may be connected to both cellular network 103 and WLAN 107, e.g., simultaneously. According to these embodiments, controller 145 may control UE 102 to route one or more types of traffic via cellular network 103 and one or more other types of traffic via WLAN 107, e.g., based on the maximal achievable rate of the WLAN connection between UE 102 and WLAN 107 and the maximal achievable rate of the cellular connection between UE 102 and cellular network 103.

In some demonstrative embodiments, utilizing the maximal achievable rate of the WLAN connection between UE 102 and WLAN 107 and the maximal achievable rate of the connection between UE 102 and cellular network 103 may enable, for example, load balancing between cellular network 103 and WLAN 107, for example, since the maximal achievable rates of networks 103 and 107 may be based on the load of networks 103 and 107.

In some demonstrative embodiments, node 104 may transmit a cellular communication message including the UE assistance parameter of cellular network 103, e.g., as described below.

In some demonstrative embodiments, transceiver 167 may transmit the cellular communication message configured to be received by UE 102 at the Idle state.

In some demonstrative embodiments, transceiver 167 may transmit the cellular communication message as part of a System Information block (SIB) message.

In some demonstrative embodiments, the SIB message may include a dedicated SIB defined for communicating the cellular load-related parameter.

In one example, the cellular load-related parameter may be included as part of a dedicated SIB type 16 ("SIB 16"), or any other type. The SIB 16 may be defined, for example, to include information relevant for inter-Radio-Access-Technologies (inter-RAT) mobility and network selection/reselection.

For example, the SIB 16 may include a value of a parameter, denoted maximumRB, representing a maximum number of resource blocks UE 102 may receive, e.g., the maximum number of resource blocks, which may be allocated by node 104 to UE 102, for example, as follows:

—ASN1START
SystemInformationBlockTypexx::=SEQUENCE{
 maximumRB INTEGER (6 . . . 100)
—ASN1STOP In other embodiments, the cellular load-related parameter, e.g., the value of the parameter maximumRB, may be included as part of any other SIB, for example, SIB type 3, 4, 5, 6 7, 8, or any other SIB.

In some demonstrative embodiments, transceiver 167 may transmit the cellular communication message configured to be received by UE 102 at the connected state.

In some demonstrative embodiments, transceiver 167 may transmit the cellular communication message as part of a Radio-Resource Control (RRC) signaling message, e.g., a RRC signaling message directed to UE 102.

In some demonstrative embodiments, transceiver 167 may transmit the cellular communication message as part of a RRCConnectionConfiguration message, or any other existing or dedicated RRC message.

For example, the RRCConnectionConfiguration message may convey information for measurement configuration, mobility control, radio resource configuration (including RBs, MAC main configuration and physical channel configuration) including any associated dedicated NAS information and security configuration. The RRCConnectionConfiguration message may be communicated, for example, over a Dedicated Control Channel (DCCH).

In one example, the RRCConnectionConfiguration message may include the following message:

| RRCConnectionReconfiguration message |
|---|

```
-- ASN1START
RRCConnectionReconfiguration ::=    SEQUENCE {
    rrc-TransactionIdentifier       RRC-TransactionIdentifier,
    criticalExtensions              CHOICE {
        c1                          CHOICE{
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture    SEQUENCE { }
    }
}
RRCConnectionReconfiguration-r8-IEs ::= SEQUENCE {
    measConfig              MeasConfig                  OPTIONAL,  -- Need ON
    mobilityControlInfo     MobilityControlInfo         OPTIONAL,  -- Cond HO
    dedicatedInfoNASList    SEQUENCE (SIZE(1..maxDRB)) OF
                            DedicatedInfoNAS            OPTIONAL,  -- Cond nonHO
    radioResourceConfigDedicated  RadioResourceConfigDedicated  OPTIONAL,  -- Cond HO-toEUTRA
    securityConfigHO        SecurityConfigHO            OPTIONAL,  -- Cond HO
    nonCriticalExtension    RRCConnectionReconfiguration-v890-IEs   OPTIONAL
}
RRCConnectionReconfiguration-v890-IEs ::= SEQUENCE {
    lateNonCriticalExtension  OCTET STRING              OPTIONAL,  -- Need OP
    nonCriticalExtension    RRCConnectionReconfiguration-v920-IEs
                            OPTIONAL
}
RRCConnectionReconfiguration-v920-IEs ::= SEQUENCE {
    otherConfig-r9          OtherConfig-r9              OPTIONAL,  -- Need ON
    fullConfig-r9           ENUMERATED {true}           OPTIONAL,  -- Cond
```

| RRCConnectionReconfiguration message |
|---|
| HO-Reestab<br>    nonCriticalExtension        RRCConnectionReconfiguration-v1020-IEs OPTIONAL<br>}<br>RRCConnectionReconfiguration-v1020-IEs ::= SEQUENCE {<br>    sCellToReleaseList-r10      SCellToReleaseList-r10      OPTIONAL, -- Need ON<br>    sCellToAddModList-r10      SCellToAddModList-r10      OPTIONAL, -- Need ON<br>    nonCriticalExtension        RRCConnectionReconfiguration-v1120-UEs OPTIONAL -- Need OP<br>}<br>RRCConnectionReconfiguration-v1120-UEs ::= SEQUENCE {<br>    maximumRB             INTEGER (6..100)             OPTIONAL, -- Need ON<br>    nonCriticalExtension        SEQUENCE { }                 OPTIONAL -- Need OP<br>}<br>SCellToAddModList-r10 ::=      SEQUENCE (SIZE (1..maxSCell-r10)) OF SCellToAddMod-r10<br>SCellToAddMod-r10 ::=      SEQUENCE {<br>    sCellIndex-r10           SCellIndex-r10,<br>    cellIdentification-r10      SEQUENCE {<br>      physCellId-r10           PhysCellId,<br>      dl-CarrierFreq-r10        ARFCN-ValueEUTRA<br>    }                                                             OPTIONAL, -- Cond SCellAdd<br>    radioResourceConfigCommonSCell-r10    RadioResourceConfigCommonSCell-r10 OPTIONAL, -- Cond SCellAdd<br>    radioResourceConfigDedicatedSCell-r10    RadioResourceConfigDedicatedSCell-r10 OPTIONAL, -- Cond SCellAdd2<br>    ...<br>}<br>SCellToReleaseList-r10 ::=      SEQUENCE (SIZE (1..maxSCell-r10)) OF SCellIndex-r10<br>SecurityConfigHO ::=      SEQUENCE {<br>    handoverType             CHOICE {<br>      intraLTE                SEQUENCE {<br>        securityAlgorithmConfig            SecurityAlgorithmConfig OPTIONAL, -- Cond fullConfig<br>        keyChangeIndicator            BOOLEAN,<br>        nextHopChainingCount          NextHopChainingCount<br>      },<br>      interRAT                SEQUENCE {<br>        securityAlgorithmConfig            SecurityAlgorithmConfig,<br>        nas-SecurityParamToEUTRA      OCTET STRING (SIZE(6))<br>      }<br>    },<br>    ...<br>}<br>-- ASN1STOP |

In one example, one or more fields of the RRCConnectionConfiguration message may be defined, e.g., as follows:

| RRCConnectionReconfiguration field descriptions |
|---|
| dedicatedInfoNASList |
| This field is used to transfer UE specific NAS layer information between the network and the UE. The RRC layer is transparent for each PDU in the list.<br>fullConfig |
| Indicates the full configuration option is applicable for the RRC Connection Reconfiguration message.<br>keyChangeIndicator |
| true is used only in an intra-cell handover when a $K_{eNB}$ key is derived from a native $K_{ASME}$ key taken into use through the successful NAS |
| SMC, as described in TS 33.401 [32] for $K_{eNB}$ re-keying. false is used in an intra-LTE handover when the new $K_{eNB}$ key is obtained from the current $K_{eNB}$ key or from the NH as described in TS 33.401 [32].<br>nas-securityParamToEUTRA |
| This field is used to transfer UE specific NAS layer information between the network and the UE. The RRC layer is transparent for this field, although it affects activation of AS-security after inter-RAT handover to E-UTRA. The content is defined in TS 24.301.<br>nextHopChainingCount |
| Parameter NCC: See TS 33.401 [32] |

| Conditional presence | Explanation |
| --- | --- |
| fullConfig | This field is mandatory present for handover within E-UTRA when the fullConfig is included; otherwise it is optionally present, Need OP. |
| HO | The field is mandatory present in case of handover within E-UTRA or to E-UTRA; otherwise the field is not present. |
| HO-Reestab | This field is optionally present, need ON, in case of handover within E-UTRA or upon the first reconfiguration after RRC connection re-establishment; otherwise the field is not present. |
| HO-toEUTRA | The field is mandatory present in case of handover to E-UTRA or for reconfigurations when fullConfig is included; otherwise the field is optionally present, need ON. |
| nonHO | The field is not present in case of handover within E-UTRA or to E-UTRA; otherwise it is optional present, need ON. |
| SCellAdd | The field is mandatory present upon SCell addition; otherwise it is not present. |
| SCellAdd2 | The field is mandatory present upon SCell addition; otherwise it is optionally present, need ON. |

In some demonstrative embodiments, it may be advantageous for node 104 not to explicitly provide to UE 102 explicit information about an actual exact load of cellular network 103. For example, some cellular network operators may consider the information about the actual network load of the cellular network to be sensitive information.

In some demonstrative embodiments, node 104 may be configured to provide the UE assistance parameter to UE 102, while not directly, explicitly, and/or easily exposing potentially sensitive information relating to the actual exact network load of cellular network 103, e.g., as described below.

In some demonstrative embodiments, node 104 may be configured to provide the UE assistance parameter in the form of a load threshold parameter, which may be comparable to a network load parameter of WLAN 107, e.g., as described below.

In some demonstrative embodiments, controller 145 may be configured to control access network selection of UE 102 with respect to WLAN 107 based on a predefined selection criterion applied to the load threshold parameter and a WLAN load of WLAN 107, e.g., as described below.

In some demonstrative embodiments, UE 102 may determine the WLAN load of WLAN 107, for example, based on information received from AP 106, for example, based on a BSS load information element (IE) broadcast by AP 106, or via any other mechanism, e.g., the ANDSF mechanism.

In some demonstrative embodiments, providing the load threshold parameter to UE 102 may enable UE 102 to make an access network selection decision without, for example, exposing to UE 102 a precise actual network load of cellular node 103.

In some demonstrative embodiments, node 104 may determine the load threshold parameter based on an actual load of cellular network 103. The load threshold parameter may optionally depend on one or more additional parameters and/or conditions of cellular network 103.

In some demonstrative embodiments, providing the load threshold parameter to UE 102 may enable UE 102 to perform access network selection, which may take into account the cellular network load of cellular network 103, for example, without disclosing to UE 102 the actual exact cellular load of cellular network 103.

In some demonstrative embodiments, node 104 may configure the load threshold parameter based one or more additional criteria and/or conditions, e.g., to influence the access network selection by controller 145.

In one example, node 104 may decide to maintain UE 102 connected to cellular network 103, for example, even when a comparison between the WLAN load of WLAN 107 and the cellular load of cellular network 103 may theoretically justify offloading UE 102 to WLAN 107, e.g., even when the WLAN load of WLAN 107 is very low and/or lesser than the cellular load of cellular network 103.

In another example, node 104 may decide to cause UE 102 to offload to WLAN 107, for example, even when a comparison between the WLAN load of WLAN 107 and the cellular load of cellular network 103 may theoretically justify using the cellular connection with cellular network 103, e.g., even when the WLAN load of WLAN 107 is very high and/or higher than the cellular load of cellular network 103.

In some demonstrative embodiments, the selection criterion used by controller 145 may be a function of a measured received signal strength indication (RSSI) measured by UE 102 with respect to WLAN 107, an RSSI threshold, the WLAN load of WLAN 107 and WLAN threshold received from node 104.

In some demonstrative embodiments, the selection criterion may be based on a ratio between a first difference between the measured RSSI and the RSSI threshold, and a second difference between the WLAN load of WLAN 107 and the WLAN threshold received from node 104.

In one example, controller 145 may make an access network decision ("mobility decision") to offload communication of UE 102 to WLAN 107, for example, if the following criterion is met:

$$(RSSI - RSSI\_t)*f + (LOAD\_t - LOAD) > 0 \qquad (1)$$

wherein RSSI denotes a WLAN RSSI of WLAN 107, e.g., as measured by UE 102; wherein RSSI_t denotes a RSSI threshold, which may be used by UE 102 to make mobility decisions; wherein f denotes a predefined factor; wherein LOAD denotes a load of WLAN 107, e.g., as determined by or received by UE 102; and wherein LOAD_t denotes the WLAN load threshold, e.g., as received by UE 102 from node 104.

For example, controller 145 may prefer communicating over the WLAN connection with AP 106, e.g., when Criterion 1 is met, and controller 145 may prefer communicating over the cellular connection with node 104, e.g., when Criterion 1 is not met.

In some demonstrative embodiments, the selection criterion used by controller 145 may be a function of a WLAN bandwidth of WLAN 107, the WLAN load of WLAN 107 and the WLAN threshold received from node 104.

In some demonstrative embodiments, controller 145 may select WLAN 107, for example, when a product of the WLAN bandwidth of WLAN 107 and the WLAN load of WLAN 107 is greater than the WLAN threshold received from node 104.

For example, controller 145 may make the mobility decision to offload communication of UE 102 to WLAN 107, for example, if the following criterion is met:

$$W\_b * W\_l > T \qquad (2)$$

wherein W_b denotes a WLAN bandwidth of WLAN 107; wherein W_l denotes a WLAN load of WLAN 107, e.g., as determined by or received by UE 102; and wherein T denotes the WLAN threshold, e.g., as received by UE 102 from node 104. For example, T may be determined by node 104 based on a bandwidth, e.g., an LTE bandwidth, of cell 103, denoted L_b, and a load, e.g., an LTE load, of cell 103, denoted L_l. For example, node 104 may determine the threshold T as T=L_b*L_l.

For example, controller 145 may prefer communicating over the WLAN connection with AP 106, e.g., when Criterion 2 is met, and controller 145 may prefer communicating over the cellular connection with node 104, e.g., when Criterion 2 is not met.

According to this example, controller 145 may be able to make the mobility decision, which is based on the cellular load of cellular network 103, e.g., as represented by the WLAN threshold parameter T, which is received from node 104, without, for example, the actual exact cellular load of cellular network 103 being disclosed to UE 102.

In some demonstrative embodiments, node 104 may be configured to provide the UE assistance parameter in the form of a cellular signal strength threshold parameter, which may be comparable to a measured cellular signal strength of the cellular network UE 102 is connected to, e.g., as described below.

In some demonstrative embodiments, the cellular signal strength threshold parameter may include a Reference Signal Received Power (RSRP) threshold, a Reference Signal Code Power (RSCP) threshold or any other threshold related to cellular signal strength.

In some demonstrative embodiments, UE 102 may perform access network selection by comparing the cellular signal strength threshold parameter to a measured signal strength of a cell it is connected to, e.g. UE 102 may prefer WLAN access network if a measured RSRP is below the signal RSRP threshold.

In some demonstrative embodiments, node 104 may transmit a cellular communication message including the load threshold parameter or signal strength threshold parameter, for example, the WLAN threshold parameter and/or RSRP threshold parameter, e.g., as described below.

In some demonstrative embodiments, transceiver 167 may transmit, e.g., broadcast, the cellular communication message including the load threshold parameter or signal strength threshold parameter configured to be received by UE 102 at the Idle state.

In some demonstrative embodiments, transceiver 167 may transmit, e.g., broadcast, the cellular communication message including the load threshold parameter or signal strength threshold parameter as part of a System Information block (SIB) message.

In some demonstrative embodiments, the SIB message may include a dedicated SIB defined for communicating the load threshold parameter or signal strength threshold parameter.

In one example, the load threshold parameter or signal strength threshold parameter may be included as part of a dedicated SIB type 16 ("SIB 16"), or any other type. The SIB 16 may be defined, for example, to include information relevant for inter-Radio-Access-Technologies (inter-RAT) mobility and network selection/reselection.

For example, the SIB 16 may include a value of a parameter, denoted wlanLoadThreshold, representing the WLAN load threshold parameter, which may be used by UE 102 to make mobility decisions to/from WLAN, for example, taking WLAN load into account, e.g., as follows:

```
-- ASN1START
SystemInformationBlockType16 ::=    SEQUENCE {
    wlanLoadThreshold               INTEGER (0..99)
-- ASN1STOP
```

In other embodiments, the load threshold parameter, e.g., the value of the parameter wlanLoadThreshold, may be included as part of any other SIB, for example, SIB type 3, 4, 5, 6 7, 8, or any other SIB.

In some demonstrative embodiments, transceiver 167 may transmit the cellular communication message configured including the load threshold or signal strength threshold parameter to be received by UE 102 at the connected state.

In some demonstrative embodiments, transceiver 167 may transmit the cellular communication message including the load threshold or signal strength threshold parameter as part of a Radio-Resource Control (RRC) signaling message, e.g., a RRC signaling message directed to UE 102.

In some demonstrative embodiments, transceiver 167 may transmit the cellular communication message as part of a RRCConnectionConfiguration message, or nay other existing or dedicated RRC message.

In one example, the RRCConnectionConfiguration message may include the following message:

| RRCConnectionReconfiguration message |
|---|

```
-- ASN1START
RRCConnectionReconfiguration ::=    SEQUENCE {
    rrc-TransactionIdentifier           RRC-TransactionIdentifier,
    criticalExtensions                  CHOICE {
        c1                              CHOICE{
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE { }
    }
}
RRCConnectionReconfiguration-r8-IEs ::= SEQUENCE {
    measConfig              MeasConfig              OPTIONAL, -- Need ON
```

| RRCConnectionReconfiguration message |
|---|
| ```
        mobilityControlInfo          MobilityControlInfo           OPTIONAL, -
- Cond HO
        dedicatedInfoNASList         SEQUENCE (SIZE(1..maxDRB)) OF
                                     DedicatedInfoNAS              OPTIONAL,  -- Cond
nonHO
        radioResourceConfigDedicated RadioResourceConfigDedicated   OPTIONAL,  -- Cond
HO-toEUTRA
        securityConfigHO             SecurityConfigHO              OPTIONAL,  -- Cond
HO
        nonCriticalExtension         RRCConnectionReconfiguration-v890-IEs  OPTIONAL
}
RRCConnectionReconfiguration-v890-IEs ::= SEQUENCE {
        lateNonCriticalExtension     OCTET STRING                  OPTIONAL,  -- Need
OP
        nonCriticalExtension         RRCConnectionReconfiguration-v920-IEs
                                     OPTIONAL
}
RRCConnectionReconfiguration-v920-IEs ::= SEQUENCE {
        otherConfig-r9               OtherConfig-r9                OPTIONAL,  -- Need
ON
        fullConfig-r9                ENUMERATED {true}             OPTIONAL,  -- Cond
HO-Reestab
        nonCriticalExtension         RRCConnectionReconfiguration-v1020-IEs
                                     OPTIONAL
}
RRCConnectionReconfiguration-v1020-IEs ::= SEQUENCE {
        sCellToReleaseList-r10       SCellToReleaseList-r10        OPTIONAL, -
- Need ON
        sCellToAddModList-r10        SCellToAddModList-r10         OPTIONAL,  -- Need
ON
        nonCriticalExtension         RRCConnectionReconfiguration-v1120-UEs OPTIONAL
-- Need OP
}
RRCConnectionReconfiguration-v1120-UEs ::= SEQUENCE {
        WlanLoadThreshold            INTEGER (0..99)               OPTIONAL, -
- Need ON
        nonCriticalExtension         SEQUENCE { }                  OPTIONAL  --
Need OP
}
SCellToAddModList-r10 ::=    SEQUENCE (SIZE (1..maxSCell-r10)) OF SCellToAddMod-
r10
SCellToAddMod-r10 ::=        SEQUENCE {
        sCellIndex-r10               SCellIndex-r10,
        cellIdentification-r10               SEQUENCE {
            physCellId-r10                   PhysCellId,
            dl-CarrierFreq-r10               ARFCN-ValueEUTRA
        }                                                          OPTIONAL,  -- Cond
SCellAdd
        radioResourceConfigCommonSCell-r10   RadioResourceConfigCommonSCell-r10
            OPTIONAL, -- Cond SCellAdd
        radioResourceConfigDedicatedSCell-r10   RadioResourceConfigDedicatedSCell-r10
            OPTIONAL,
-- Cond SCellAdd2
        ...
}
SCellToReleaseList-r10 ::=   SEQUENCE (SIZE (1..maxSCell-r10)) OF
SCellIndex-r10
SecurityConfigHO ::=         SEQUENCE {
        handoverType                 CHOICE {
            intraLTE                 SEQUENCE {
securityAlgorithmConfig                      SecurityAlgorithmConfig
                OPTIONAL,   -- Cond fullConfig
                keyChangeIndicator           BOOLEAN,
                nextHopChainingCount         NextHopChainingCount
            },
            interRAT                 SEQUENCE {
                securityAlgorithmConfig      SecurityAlgorithmConfig,
                nas-SecurityParamToEUTRA     OCTET STRING (SIZE(6))
            }
        },
        ...
}
-- ASN1STOP
``` |

Figure 2:
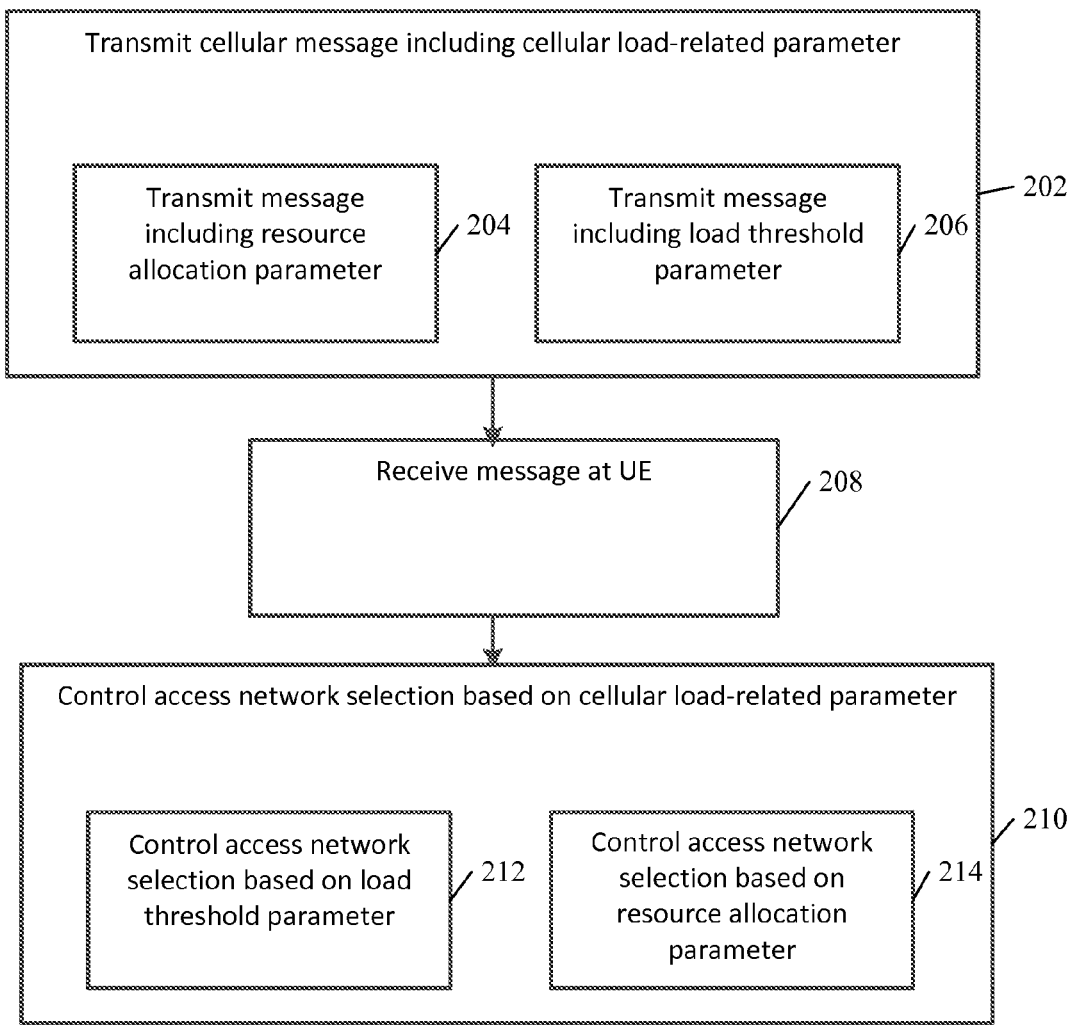
FIG. 2 is a schematic flow-chart illustration of a method of User Equipment (UE) centric access network selection, in accordance with some demonstrative embodiments.

Reference is made to FIG. 2, which schematically illustrates a method of UE-centric access network selection, in accordance with some demonstrative embodiments. In some embodiments, one or more of the operations of the method of FIG. 2 may be performed by a wireless communication system e.g., system 100 (FIG. 1); a wireless communication device, e.g., UE 102 (FIG. 1), node 104 (FIG. 1) and/or AP 106 (FIG. 1); and/or a wireless communication unit, e.g., wireless communication units 110 and/or 130 (FIG. 1).

As indicated at block 202, the method may include transmitting a cellular communication message from a cellular node to a UE over a cellular communication medium, the message including a value of a predefined parameter, which is based on a cellular network load of a cellular network controlled by the cellular node. For example, node 104 (FIG. 1) may transmit to UE 102 (FIG. 1) a cellular communication message, for example, a SIB message or an RRC signaling message, including the cellular load-related parameter, e.g., as described above.

As indicated at block 204, transmitting a cellular communication message may include transmitting a cellular communication message including a resource allocation parameter representing an amount of resource for allocation by the cellular node to the UE. For example, node 104 (FIG. 1) may transmit to UE 102 (FIG. 1) a cellular communication message, for example, a SIB message or an RRC signaling message, including a maximal resource block parameter representing a maximal number of resource blocks for allocation by node 104 (FIG. 1) to UE 102 (FIG. 1), e.g., as described above.

As indicated at block 206, transmitting a cellular communication message may include transmitting a cellular communication message including a load threshold parameter comparable to a non-cellular network load parameter of a non-cellular network. For example, node 104 (FIG. 1) may transmit to UE 102 (FIG. 1) a cellular communication message, for example, a SIB message or an RRC signaling message, including a WLAN load threshold parameter, e.g., as described above.

As indicated at block 208, the method may include receiving the cellular communication message at the UE. For example, UE 102 (FIG. 1) may receive the cellular communication message, e.g., as described above.

As indicated at block 210, the method may include controlling access network selection of the UE with respect to a WLAN based on the value of the parameter. For example, controller 145 (FIG. 1) may control access network selection of UE 102 (FIG. 1) with respect to WLAN 107 (FIG. 1) based on the cellular load-related parameter, e.g., as described above As indicated at block 212, controlling access network selection of the UE may include controlling access network selection of the UE based on a predefined selection criterion applied to the WLAN load threshold parameter and a WLAN load of the WLAN. For example, controller 145 (FIG. 1) may control access network selection of UE 102 (FIG. 1) based on Criterion 1 or Criterion 2, e.g., as described above.

As indicated at block 214, controlling access network selection of the UE may include determining an achievable rate of communication with the cellular node based on the value of the resource allocation parameter, and controlling access network selection of the UE based on a comparison between the achievable rate of communication with the cellular node and an achievable rate of communication with the WLAN. For example, controller 145 (FIG. 1) may determine an achievable rate of communication with node (FIG. 1) based on the value of the resource allocation parameter received from node 104 (FIG. 1), and may control access network selection of UE 102 (FIG. 1) based on a comparison between the achievable rate of communication with node 104 (FIG. 1) and an achievable rate of communication with WLAN 107 (FIG. 1), e.g., as described above.

Figure 3:
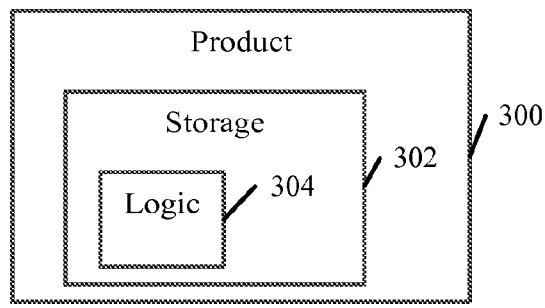
FIG. 3 is a schematic illustration of a product, in accordance with some demonstrative embodiments.

Reference is made to FIG. 3, which schematically illustrates a product of manufacture 300, in accordance with some demonstrative embodiments. Product 300 may include a non-transitory machine-readable storage medium 302 to store logic 304, which may be used, for example, to perform at least part of the functionality of UE 102 (FIG. 1), node 104 (FIG. 1), AP 106 (FIG. 1), wireless communication unit 110 (FIG. 1), wireless communication unit 130 (FIG. 1) to perform one or more operations of the method of FIG. 2. The phrase "non-transitory machine-readable medium" is directed to include all computer-readable media, with the sole exception being a transitory propagating signal.

In some demonstrative embodiments, product 300 and/or machine-readable storage medium 302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a cellular node comprising a transmitter to transmit to a User Equipment (UE) a cellular communication message over a cellular communication medium, the message including a UE-assistance information to assist in access network selection, the UE-assistance information including a value of a predefined parameter, which is based on a cellular network load of a cellular network controlled by the cellular node, the value of the predefined parameter is comparable to a non-cellular network load of at least one non-cellular network.

Example 2 includes the subject matter of Example 1, and optionally, wherein the predefined parameter comprises a resource allocation parameter representing an amount of resource for allocation by the cellular node to the UE.

Example 3 includes the subject matter of Example 2, and optionally, wherein the resource allocation parameter comprises a maximal resource block parameter representing a maximal number of resource blocks for allocation by the cellular node to the UE.

Example 4 includes the subject matter of Example 1, and optionally, wherein the predefined parameter comprises a load threshold parameter comparable to a non-cellular network load parameter of a non-cellular network.

Example 5 includes the subject matter of Example 4, and optionally, wherein the load threshold parameter comprises a Wireless-Local-Area-Network (WLAN) load threshold parameter.

Example 6 includes the subject matter of Example 1, and optionally, wherein the predefined parameter comprises a cellular network signal strength threshold parameter.

Example 7 includes the subject matter of any one of Examples 1-6, and optionally, wherein the cellular communication message comprises a Radio-Resource Control (RRC) signaling message.

Example 8 includes the subject matter of Example 7, and optionally, wherein the RRC signaling message comprises a RRCConnectionConfiguration message.

Example 9 includes the subject matter of any one of Examples 1-6, and optionally, wherein the cellular communication message comprises a System Information block (SIB).

Example 10 includes the subject matter of any one of any one of Examples 1-9, and optionally, wherein the transmitter is to transmit the cellular communication message to be received by the UE at an Idle state.

Example 11 includes the subject matter of any one of any one of Examples 1-9, and optionally, wherein the transmitter is to transmit the cellular communication message to be received by the UE at a connected state.

Example 12 includes the subject matter of any one of any one of Examples 1-11, and optionally, comprising an Evolved node B (eNB).

Example 13 includes a User Equipment (UE) comprising a Wireless Local Area Network (WLAN) transceiver; a cellular transceiver to receive from a cellular network a cellular communication message including a value of a WLAN load threshold parameter; and a controller to control access network selection of the UE based on a predefined selection criterion applied to the load threshold parameter and a WLAN load of a WLAN.

Example 14 includes the subject matter of Example 13, and optionally, wherein the selection criterion is a function of a measured received signal strength indication (RSSI) measured by the UE with respect to the WLAN, an RSSI threshold, the WLAN load of the WLAN and the WLAN threshold.

Example 15 includes the subject matter of Example 14, and optionally, wherein the selection criterion is based on a ratio between a first difference between the measured RSSI and the RSSI threshold, and a second difference between the WLAN load of the WLAN and the WLAN threshold.

Example 16 includes the subject matter of Example 13, and optionally, wherein the selection criterion is a function of a WLAN bandwidth of the WLAN, the WLAN load of the WLAN and the WLAN threshold.

Example 17 includes the subject matter of Example 16, and optionally, wherein the controller is to select the WLAN when a product of the WLAN bandwidth of the WLAN and the WLAN load of the WLAN is greater than the WLAN threshold.

Example 18 includes the subject matter of any one of Examples 13-17, and optionally, wherein the cellular communication message comprises a Radio-Resource Control (RRC) signaling message.

Example 19 includes the subject matter of Example 18, and optionally, wherein the RRC signaling message comprises a RRCConnectionConfiguration message.

Example 20 includes the subject matter of any one of Examples 13-17, and optionally, wherein the cellular communication message comprises a System Information block (SIB).

Example 21 includes the subject matter of any one of any one of Examples 13-20, and optionally, wherein the cellular transceiver is to receive the cellular communication message when the UE is at an Idle state.

Example 22 includes the subject matter of any one of any one of Examples 13-20, and optionally, wherein the cellular transceiver is to receive the cellular communication message when the UE is at a connected state.

Example 23 includes a User Equipment (UE) comprising a Wireless Local Area Network (WLAN) transceiver; a cellular transceiver to receive from a cellular network a cellular communication message including a value of a predefined parameter, which is based on a cellular network load of the cellular network; and a controller to control access network selection of the UE with respect to a WLAN based on the value of the parameter.

Example 24 includes the subject matter of Example 23, and optionally, wherein the predefined parameter comprises a resource allocation parameter representing an amount of resource for allocation by the cellular network to the UE.

Example 25 includes the subject matter of Example 24, and optionally, wherein the resource allocation parameter comprises a maximal resource block parameter representing a maximal number of resource blocks for allocation by the cellular network to the UE.

Example 26 includes the subject matter of Example 23 or 24, and optionally, wherein the controller is to determine an achievable rate of communication with the cellular network based on the value of the resource allocation parameter, and to control the access network selection based on a comparison between achievable rate of communication with the cellular network and an achievable rate of communication with the WLAN.

Example 27 includes the subject matter of Example 23, and optionally, wherein the parameter comprises a load threshold parameter, and wherein the controller to control the access network selection based on a predefined selection criterion applied to the load threshold parameter and a WLAN load of the WLAN.

Example 28 includes the subject matter of Example 27, and optionally, wherein the load threshold parameter comprises a Wireless-Local-Area-Network (WLAN) load threshold parameter.

Example 29 includes the subject matter of Example 28, and optionally, wherein the criterion is a function of a measured received signal strength indication (RSSI) measured by the UE with respect to the WLAN, an RSSI threshold, the WLAN load of the WLAN and the WLAN threshold.

Example 30 includes the subject matter of Example 28, and optionally, wherein the selection criterion is a function of a WLAN bandwidth of the WLAN, the WLAN load of the WLAN and the WLAN threshold.

Example 31 includes the subject matter of Example 27, and optionally, wherein the parameter comprises a cellular signal strength threshold parameter.

Example 32 includes the subject matter of any one of Examples 23-31, and optionally, wherein the cellular communication message comprises a Radio-Resource Control (RRC) signaling message.

Example 33 includes the subject matter of Example 32, and optionally, wherein the RRC signaling message comprises a RRCConnectionConfiguration message.

Example 34 includes the subject matter of any one of Examples 23-31, and optionally, wherein the cellular communication message comprises a System Information block (SIB).

Example 35 includes the subject matter of any one of any one of Examples 23-34, and optionally, wherein the cellular transceiver is to receive the cellular communication message when the UE is at an Idle state.

Example 36 includes the subject matter of any one of any one of Examples 23-34, and optionally, wherein the cellular transceiver is to receive the cellular communication message when the UE is at a connected state.

Example 37 includes a method comprising communicating between a cellular node and a User Equipment (UE) at least one cellular communication message over a cellular communication medium, the message including a value of a predefined parameter, which is based on a cellular network load of a cellular network controlled by the cellular node.

Example 38 includes the subject matter of Example 37, and optionally, wherein the predefined parameter comprises a resource allocation parameter representing an amount of resource for allocation by the cellular node to the UE.

Example 39 includes the subject matter of Example 38, and optionally, wherein the resource allocation parameter comprises a maximal resource block parameter representing a maximal number of resource blocks for allocation by the cellular node to the UE.

Example 40 includes the subject matter of Example 37, and optionally, wherein the predefined parameter comprises a load threshold parameter comparable to a non-cellular network load parameter of a non-cellular network.

Example 41 includes the subject matter of Example 40, and optionally, wherein the load threshold parameter comprises a Wireless-Local-Area-Network (WLAN) load threshold parameter.

Example 42 includes the subject matter of Example 37, and optionally, wherein the predefined parameter comprises a cellular network signal strength threshold.

Example 43 includes the subject matter of any one of Examples 37-42, and optionally, wherein the cellular communication message comprises a Radio-Resource Control (RRC) signaling message.

Example 44 includes the subject matter of Example 43, and optionally, wherein the RRC signaling message comprises a RRCConnectionConfiguration message.

Example 45 includes the subject matter of any one of Examples 37-42, and optionally, wherein the cellular communication message comprises a System Information block (SIB).

Example 46 includes the subject matter of any one of any one of Examples 37-45, and optionally, comprising transmitting the cellular communication message from the cellular node to the UE.

Example 47 includes the subject matter of Example 46, and optionally, comprising transmitting the cellular communication message to be received by the UE at an Idle state.

Example 48 includes the subject matter of Example 46, and optionally, comprising transmitting the cellular communication message to be received by the UE at a connected state.

Example 49 includes the subject matter of any one of any one of Examples 37-45, and optionally, comprising receiving the cellular communication message at the UE.

Example 50 includes the subject matter of Example 49, and optionally, comprising controlling access network selection of the UE with respect to a WLAN based on the value of the parameter.

Example 51 includes the subject matter of Example 50, and optionally, wherein the predefined parameter comprises a maximal resource block parameter representing a maximal number of resource blocks for allocation by the cellular node to the UE, the controlling comprises determining an achievable rate of communication with the cellular node based on the value of the resource allocation parameter, and controlling the access network selection based on a comparison between achievable rate of communication with the cellular node and an achievable rate of communication with the WLAN.

Example 52 includes the subject matter of Example 50, and optionally, wherein the predefined parameter comprises a load threshold parameter, and wherein the controlling comprises controlling the access network selection based on a predefined selection criterion applied to the load threshold parameter and a WLAN load of the WLAN.

Example 53 includes the subject matter of Example 52, and optionally, wherein the load threshold parameter comprises a Wireless-Local-Area-Network (WLAN) load threshold parameter.

Example 54 includes the subject matter of Example 53, and optionally, wherein the criterion is a function of a measured received signal strength indication (RSSI) measured by the UE with respect to the WLAN, an RSSI threshold, the WLAN load of the WLAN and the WLAN threshold.

Example 55 includes the subject matter of Example 53, and optionally, wherein the selection criterion is a function of a WLAN bandwidth of the WLAN, the WLAN load of the WLAN and the WLAN threshold.

Example 56 includes Long Term Evolution (LTE) cellular communication system comprising an Evolved Node B (eNB) to transmit to a User Equipment (UE) a cellular communication message over a cellular communication medium, the message including a value of a predefined parameter, which is based on a cellular network load of a cellular network controlled by the eNB.

Example 57 includes the subject matter of Example 56, and optionally, wherein the predefined parameter comprises a resource allocation parameter representing an amount of resource for allocation by the eNB to the UE.

Example 58 includes the subject matter of Example 57, and optionally, wherein the resource allocation parameter comprises a maximal resource block parameter representing a maximal number of resource blocks for allocation by the eNB to the UE.

Example 59 includes the subject matter of Example 56, and optionally, wherein the predefined parameter comprises a load threshold parameter comparable to a non-cellular network load parameter of a non-cellular network.

Example 60 includes the subject matter of Example 59, and optionally, wherein the load threshold parameter comprises a Wireless-Local-Area-Network (WLAN) load threshold parameter.

Example 61 includes the subject matter of Example 56, and optionally, wherein the predefined parameter comprises a cellular network signal strength threshold.

Example 62 includes the subject matter of any one of Examples 56-61, and optionally, wherein the cellular communication message comprises a Radio-Resource Control (RRC) signaling message.

Example 63 includes the subject matter of Example 62, and optionally, wherein the RRC signaling message comprises a RRCConnectionConfiguration message.

Example 64 includes the subject matter of any one of Examples 56-61, and optionally, wherein the cellular communication message comprises a System Information block (SIB).

Example 65 includes the subject matter of any one of any one of Examples 56-64, and optionally, wherein the transmitter is to transmit the cellular communication message to be received by the UE at an Idle state.

Example 66 includes the subject matter of any one of any one of Examples 56-64, and optionally, wherein the transmitter is to transmit the cellular communication message to be received by the UE at a connected state.

Example 67 includes A product including a non-transitory storage medium having stored thereon instructions that, when executed by a machine, result in communicating between a cellular node and a User Equipment (UE) at least one cellular communication message over a cellular communication medium, the message including a value of a predefined parameter, which is based on a cellular network load of a cellular network.

Example 68 includes the subject matter of Example 67, and optionally, wherein the predefined parameter comprises a resource allocation parameter representing an amount of resource for allocation to the UE.

Example 69 includes the subject matter of Example 68, and optionally, wherein the resource allocation parameter comprises a maximal resource block parameter representing a maximal number of resource blocks for allocation to the UE.

Example 70 includes the subject matter of Example 67, and optionally, wherein the predefined parameter comprises a load threshold parameter comparable to a non-cellular network load parameter of a non-cellular network.

Example 71 includes the subject matter of Example 70, and optionally, wherein the load threshold parameter comprises a Wireless-Local-Area-Network (WLAN) load threshold parameter.

Example 72 includes the subject matter of any one of Examples 67-71, and optionally, wherein the cellular communication message comprises a Radio-Resource Control (RRC) signaling message.

Example 73 includes the subject matter of Example 72, and optionally, wherein the RRC signaling message comprises a RRCConnectionConfiguration message.

Example 74 includes the subject matter of any one of Examples 67-71, and optionally, wherein the cellular communication message comprises a System Information block (SIB).

Example 75 includes the subject matter of any one of any one of Examples 67-74, and optionally, wherein the instructions result in transmitting the cellular communication message from the cellular node to the UE.

Example 76 includes the subject matter of Example 75, and optionally, wherein the instructions result in transmitting the cellular communication message to be received by the UE at an Idle state.

Example 77 includes the subject matter of Example 75, and optionally, wherein the instructions result in transmitting the cellular communication message to be received by the UE at a connected state.

Example 78 includes the subject matter of any one of any one of Examples 67-74, and optionally, wherein the instructions result in receiving the cellular communication message at the UE.

Example 79 includes the subject matter of Example 78, and optionally, wherein the instructions result in controlling access network selection of the UE with respect to a WLAN based on the value of the parameter.

Example 80 includes the subject matter of Example 79, and optionally, wherein the predefined parameter comprises a maximal resource block parameter representing a maximal number of resource blocks for allocation by the cellular node to the UE, the controlling comprises determining an achievable rate of communication with the cellular node based on the value of the resource allocation parameter, and controlling the access network selection based on a comparison between achievable rate of communication with the cellular node and an achievable rate of communication with the WLAN.

Example 81 includes the subject matter of Example 79, and optionally, wherein the predefined parameter comprises a load threshold parameter, and wherein the controlling comprises controlling the access network selection based on a predefined selection criterion applied to the load threshold parameter and a WLAN load of the WLAN.

Example 82 includes the subject matter of Example 79, and optionally, wherein the load threshold parameter comprises a Wireless-Local-Area-Network (WLAN) load threshold parameter.

Example 83 includes the subject matter of Example 82, and optionally, wherein the criterion is a function of a measured received signal strength indication (RSSI) measured by the UE with respect to the WLAN, an RSSI threshold, the WLAN load of the WLAN and the WLAN threshold.

Example 84 includes the subject matter of Example 82, and optionally, wherein the selection criterion is a function of a WLAN bandwidth of the WLAN, the WLAN load of the WLAN and the WLAN threshold.

Example 85 includes an apparatus comprising means for communicating between a cellular node and a User Equipment (UE) at least one cellular communication message over a cellular communication medium, the message including a value of a predefined parameter, which is based on a cellular network load of a cellular network controlled by the cellular node.

Example 86 includes the subject matter of Example 85, and optionally, wherein the predefined parameter comprises a resource allocation parameter representing an amount of resource for allocation by the cellular node to the UE.

Example 87 includes the subject matter of Example 86, and optionally, wherein the resource allocation parameter comprises a maximal resource block parameter representing a maximal number of resource blocks for allocation by the cellular node to the UE.

Example 88 includes the subject matter of Example 85, and optionally, wherein the predefined parameter comprises a load threshold parameter comparable to a non-cellular network load parameter of a non-cellular network.

Example 89 includes the subject matter of Example 88, and optionally, wherein the load threshold parameter comprises a Wireless-Local-Area-Network (WLAN) load threshold parameter.

Example 90 includes the subject matter of Example 85, and optionally, wherein the predefined parameter comprises a cellular network signal strength threshold.

Example 91 includes the subject matter of any one of Examples 85-90, and optionally, wherein the cellular communication message comprises a Radio-Resource Control (RRC) signaling message.

Example 92 includes the subject matter of Example 91, and optionally, wherein the RRC signaling message comprises a RRCConnectionConfiguration message.

Example 93 includes the subject matter of any one of Examples 85-90, and optionally, wherein the cellular communication message comprises a System Information block (SIB).

Example 94 includes the subject matter of any one of any one of Examples 85-93, and optionally, comprising means for transmitting the cellular communication message from the cellular node to the UE.

Example 95 includes the subject matter of Example 94, and optionally, comprising means for transmitting the cellular communication message to be received by the UE at an Idle state.

Example 96 includes the subject matter of Example 94, and optionally, comprising means for transmitting the cellular communication message to be received by the UE at a connected state.

Example 97 includes the subject matter of any one of any one of Examples 85-93, and optionally, comprising means for receiving the cellular communication message at the UE.

Example 98 includes the subject matter of Example 97, and optionally, comprising means for controlling access network selection of the UE with respect to a WLAN based on the value of the parameter.

Example 99 includes the subject matter of Example 98, and optionally, wherein the predefined parameter comprises a maximal resource block parameter representing a maximal number of resource blocks for allocation by the cellular node to the UE, the controlling comprises determining an achievable rate of communication with the cellular node based on the value of the resource allocation parameter, and controlling the access network selection based on a comparison between achievable rate of communication with the cellular node and an achievable rate of communication with the WLAN.

Example 100 includes the subject matter of Example 98, and optionally, wherein the predefined parameter comprises a load threshold parameter, and wherein the controlling comprises controlling the access network selection based on a predefined selection criterion applied to the load threshold parameter and a WLAN load of the WLAN.

Example 101 includes the subject matter of Example 100, and optionally, wherein the load threshold parameter comprises a Wireless-Local-Area-Network (WLAN) load threshold parameter.

Example 102 includes the subject matter of Example 101, and optionally, wherein the criterion is a function of a measured received signal strength indication (RSSI) measured by the UE with respect to the WLAN, an RSSI threshold, the WLAN load of the WLAN and the WLAN threshold.

Example 103 includes the subject matter of Example 101, and optionally, wherein the selection criterion is a function of a WLAN bandwidth of the WLAN, the WLAN load of the WLAN and the WLAN threshold.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A cellular node comprising:
a transmitter to transmit to a User Equipment (UE) a cellular communication message over a cellular communication medium, the message including UE-assistance information to assist in access network selection, the UE-assistance information including a Wireless-Local-Area-Network (WLAN) load threshold value, which is based on a cellular network load of a cellular network controlled by said cellular node, the WLAN load threshold value is different from the cellular network load, the WLAN load threshold value is comparable to a WLAN load of at least one WLAN, the UE-assistance information is to assist access network selection at the UE without the cellular network load being disclosed to the UE.

2. The cellular node of claim 1, wherein said UE-assistance information comprises a resource allocation parameter representing an amount of resource for allocation by the cellular node to said UE.

3. The cellular node of claim 2, wherein said UE-assistance information comprises a maximal resource block parameter representing a maximal number of resource blocks for allocation by the cellular node to said UE.

4. The cellular node of claim 1, wherein said UE-assistance information comprises a cellular network signal strength threshold parameter.

5. The cellular node of claim 1, wherein said cellular communication message comprises a Radio-Resource Control (RRC) signaling message.

6. The cellular node of claim 5, wherein said RRC signaling message comprises a RRCConnectionConfiguration message.

7. The cellular node of claim 1, wherein said cellular communication message comprises a System Information block (SIB).

8. The cellular node of claim 1 comprising an Evolved node B (eNB).

9. A User Equipment (UE) comprising:
a Wireless Local Area Network (WLAN) transceiver;
a cellular transceiver to receive from an Evolved node B (eNB) of a cellular network
a cellular communication message including a value of a WLAN load threshold parameter, the value of the WLAN load threshold parameter is different from the load of the cellular network; and
a controller to control access network selection at said UE based on a predefined selection criterion applied to the value of the WLAN load threshold parameter and a WLAN load of a WLAN, without the cellular network load being disclosed to the UE.

10. The UE of claim 9, wherein said selection criterion is a function of a measured received signal strength indication (RSSI) measured by said UE with respect to said WLAN, an RSSI threshold, the WLAN load of said WLAN and the value of said WLAN load threshold parameter.

11. The UE of claim 10, wherein said selection criterion is based on a ratio between a first difference between the measured RSSI and the RSSI threshold, and a second difference between the WLAN load of said WLAN and the value of said WLAN load threshold parameter.

12. The UE of claim 9, wherein said selection criterion is a function of a WLAN bandwidth of said WLAN, the WLAN load of said WLAN and the value of said WLAN threshold parameter.

13. The UE of claim 12, wherein said controller is to select said WLAN when a product of the WLAN bandwidth of said WLAN and the WLAN load of said WLAN is greater than the value of said WLAN threshold parameter.

14. The UE of claim 9, wherein said cellular transceiver is to receive said cellular communication message when said UE is at an Idle state.

15. The UE of claim 9, wherein said cellular transceiver is to receive said cellular communication message when said UE is at a connected state.

16. A User Equipment (UE) comprising:
a Wireless Local Area Network (WLAN) transceiver;
a cellular transceiver to receive from a cellular network a cellular communication message including a Wireless-Local-Area-Network (WLAN) load threshold value, which is based on a cellular network load of said cellular network, the WLAN load threshold value is different from the cellular network load; and
a controller to control access network selection at said UE with respect to a WLAN based on the WLAN load threshold value, without the cellular network load being disclosed to the UE.

17. The UE of claim 16, wherein the cellular communication message comprises a resource allocation parameter representing an amount of resource for allocation by the cellular network to said UE.

18. The UE of claim 16, wherein said controller is configured to control said access network selection based on a predefined selection criterion applied to the WLAN load threshold value and a WLAN load of said WLAN.

19. A product including a non-transitory storage medium having stored thereon instructions that, when executed by a machine, result in:
communicating between a cellular node and a User Equipment (UE) at least one cellular communication message over a cellular communication medium, the message including a Wireless-Local-Area-Network (WLAN) load threshold value, which is based on a cellular network load of a cellular network, the WLAN load threshold value is different from the cellular network load, wherein the WLAN load threshold value is to assist access network selection at the UE without the cellular network load being disclosed to the UE.

20. The product of claim 19, wherein said message comprises a resource allocation parameter representing an amount of resource for allocation to said UE.

21. The product of claim 19, wherein said instructions result in receiving said cellular communication message at said UE.

22. The product of claim 21, wherein said instructions result in controlling access network selection of said UE with respect to a WLAN based on the WLAN load threshold value.

* * * * *